Jan. 16, 1973   F. P. DANIEL   3,711,335
BATTERY HAVING TERMINAL MOLDED IN WALL OF CONTAINER
Filed Feb. 12, 1971   3 Sheets-Sheet 1

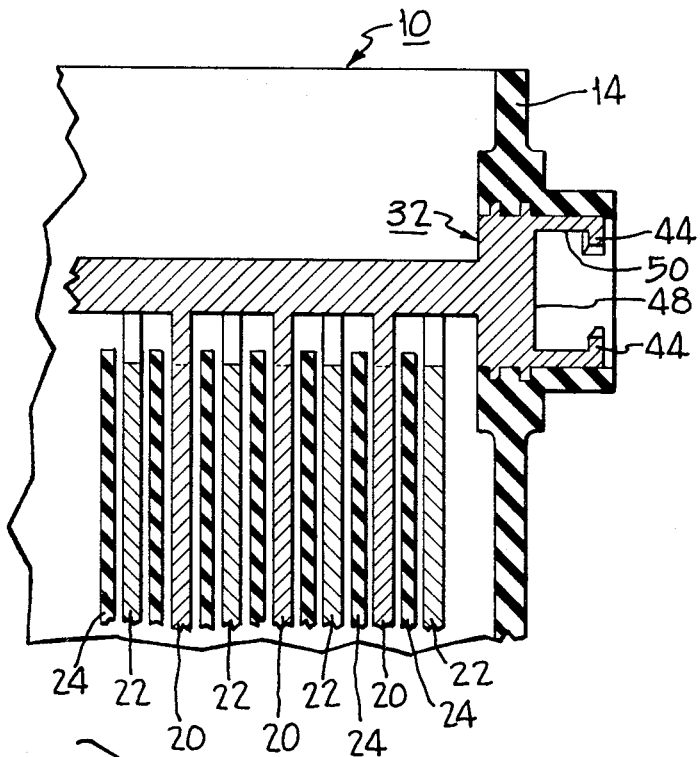
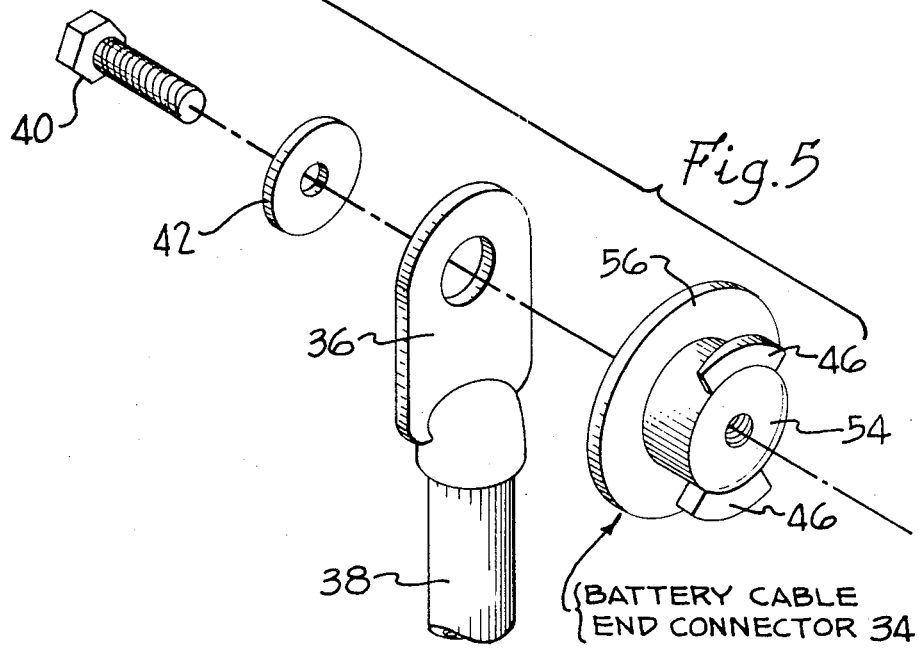

Jan. 16, 1973  F. P. DANIEL  3,711,335
BATTERY HAVING TERMINAL MOLDED IN WALL OF CONTAINER
Filed Feb. 12, 1971  3 Sheets-Sheet 3

United States Patent Office 3,711,335
Patented Jan. 16, 1973

3,711,335
BATTERY HAVING TERMINAL MOLDED IN WALL OF CONTAINER
Fred P. Daniel, North Olmstead, Ohio, assignor to ESB Incorporated, Philadelphia, Pa.
Filed Feb. 12, 1971, Ser. No. 115,016
Int. Cl. H01m 5/00
U.S. Cl. 136—135 S
5 Claims

ABSTRACT OF THE DISCLOSURE

A battery has a terminal connection molded into the wall of the battery. The terminal connection has means that cooperate with a battery cable end connector so that the battery cable end connector can be connected to the terminal connection by a rotation of the cable end connector. The terminal connection may be an integrally constructed extension of the strap connector to which it is joined.

BACKGROUND OF THE INVENTION

A review of several previous techniques which have previously been used in the construction of automotive battery terminals, and the characteristics of them, will provide a helpful background for an understanding of the present invention.

No doubt the method used most commonly in recent decades is one which began with lead terminal posts which were connected to and projected upward from a strap connector in each of the two end cells. These posts fitted through two openings in the battery's cover. The cover had lead bushings molded into them, and the terminal posts extended through the bushings. After the cover had been placed onto the battery container the terminal posts and bushings were fused together by heat, usually from a gas torch. A mold was usually placed around the post while the fusing was taking place, and lead from an outside bar was often melted and added into the mold to form part of the fused joint. The fusion was usually done manually by workmen who operated the gas torches.

This commonly used prior method had several characteristics which were undesirable. Labor costs were involved, since two such fusions were required with each battery. The upwardly projecting terminal posts required considerable lead and resulted in relatively long electrical paths and high electrical resistances. The gas torches which were required could result in damage to the cover or container if not handled skillfully by an experienced worker. If the fusion between the terminal post and the bushing was not complete, the resulting small fissures between the two provided paths for the future escape of corrosive gases and electrolyte. And the fused joints between the terminal posts and bushings were jeopardized and sometimes cracked by the weight of additional batteries which were stacked above.

Other design approaches have seen the terminals extended outward through the side or end wall of the container, sometimes at or near the level of the connecting straps. One usual desirable consequence of such designs, compared with the alternative described above, was a reduction in the length of electrical path with its resultant savings in both lead and internal power losses. A savings of several inches in the length of each battery cable is also often possible with the use of side rather than top battery terminals, and this feature can result in significant materials savings to an automobile manufacturer producing large quantities of cars. While many of these side container designs resembled the alternate through-the-cover designs to the extent that they required projections to extend through an external wall of the battery, they were nevertheless improvements in some respects. For instance, the necessary joints or fusions which were required could be performed by automatic machinery rather than manually, a possibility which is made more feasible by the fact that the required machinery can reach inside the uncovered battery container to contact inside components. For examples, see U.S. Pats. 3,303,056 and 3,457,118. The side terminals also have the advantage that they do not serve as direct support posts or pillars if additional batteries are stacked above, and so the threat of destruction to any fused joint in the terminal where it passes through the container wall is lessened. On the negative side of the picture is the fact that the consequences of having an ineffective joint or fusion may be worse with the side terminals than with the top terminals, since they are at or nearer the level of the corrosive sulfuric acid electrolyte.

Other side terminal designs have seen metal components molded into the exterior walls of the battery containers rather than extending through apertures as shown in U.S. Pats. 3,303,056 and 3,457,118. See, for instance, U.S. Pats. 1,829,935 and 1,980,902. These designs have required a burning or other step inside the container so that the terminal piece could be joined to the electrodes or their strap connectors. They also have been characterized by long, circuitous electrical paths.

Another characteristic of many previous battery terminal and cable designs has been that threaded devices such as nuts and bolts were used to secure the cable to the finished battery. While these threaded components of the connections resulted in relatively good contact and therefore electrical conductivity being achieved, they required both tools and time to be utilized. What has been desired for years is a good terminal design so that the cable could be attached quickly and without tools.

SUMMARY OF THE INVENTION

This invention provides an improved battery terminal design which is molded into the side or end wall of the battery container. The terminal has a low lead content and a low electrical resistance. The terminal design eliminates the need to fuse, join, or crimp together in some fashion a post or projection extending through an aperture in the container wall, thereby saving labor or machine steps, eliminating the possibility of an ineffective fused joint, and eliminating the danger of destruction to a fused joint from objects stacked above the battery.

Another important feature of the invention is that the terminal connection has means that cooperate with a battery cable end connector so that the battery cable end connector can be connected to the terminal connection by a simple rotation of the cable end connector. The required connection can be made quickly and easily.

The terminal connection may be an integrally constructed extension of the strap connector to which it is joined, a significant advantage since it eliminates the need for a separate step to join the molded insert terminal connection to the strap connector.

The terminal connection also simplifies the sealing of a cover onto the battery container where heat sealing of thermoplastic materials by the use of automated heating platens or wires are involved. With many previous battery designs the terminal posts projected upward through the plane defined by the top of the container, requiring the platens to be provided with a pair of holes to receive the posts so that the platen could reach and heat the mating surfaces of the plastic cover and container. Because of this, the platens also had to be moved vertically with the prior process so that they could first be fitted over and later removed from the terminal posts; these vertical movements increased the time required to make a seal between cover and container, increased the complexity and therefore cost of the automatic machinery which was used, and allowed the heated plastic surfaces to cool while the platen was being removed vertically before the seal could be made. The use of a sliding heating wire was made difficult or impossible with the vertical terminal posts because of the wire would become entangled on the posts; by eliminating the vertical terminal posts, this invention makes the use of such wires more feasible for heat seals.

BRIEF DESCRIPTION OF THE DRAWINGS

FIG. 4 is a sectional view taken along the line A—A of FIG. 1.

FIG. 5 is an exploded perspective view of the battery cable end connector, the battery cable, and associated parts.

DESCRIPTION OF THE PREFERRED EMBODIMENTS

Figure 1:
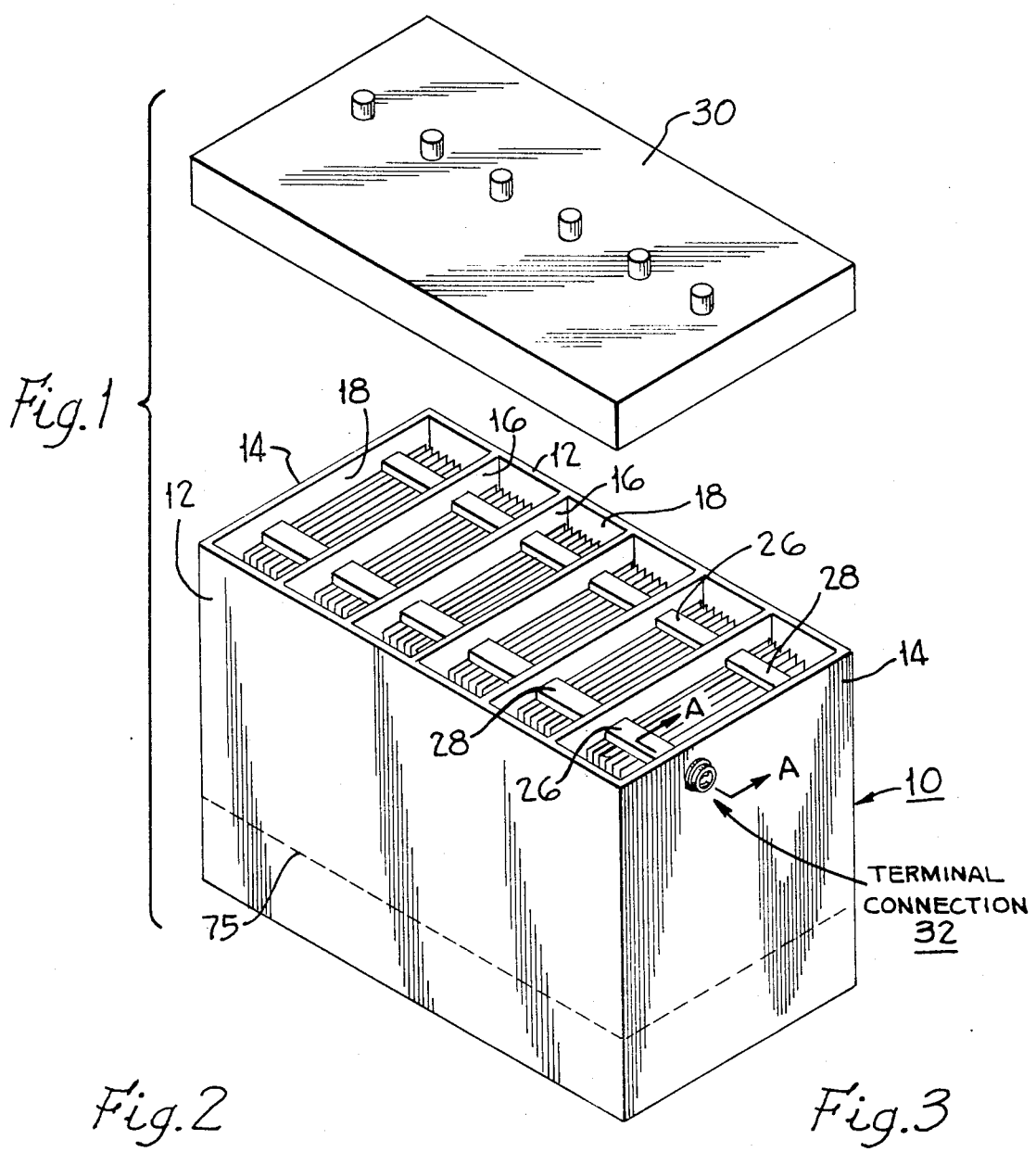
FIG. 1 shows an automobile battery having the new terminal connection.
Figures 2, 3:
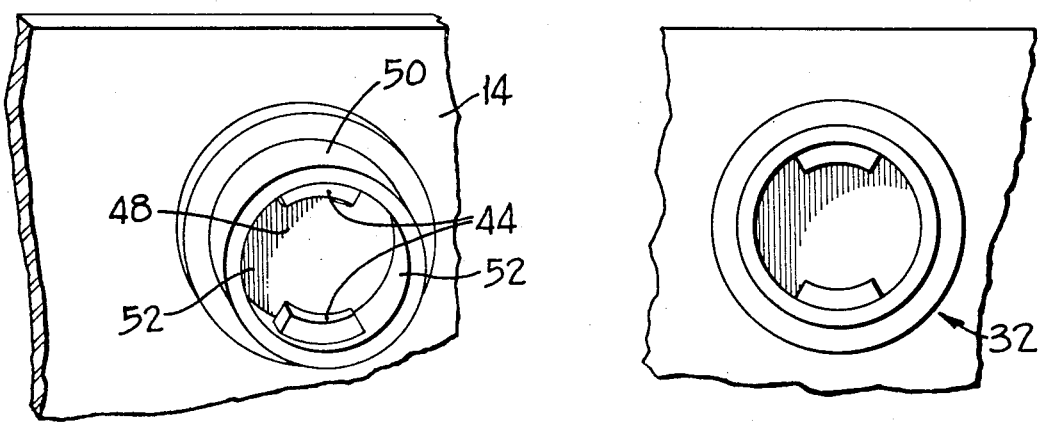
FIG. 2 is a perspective of a portion of the battery wall showing the new terminal connection.
FIG. 3 is an elevation view of the terminal connection and battery wall shown in FIG. 2.
Figure 6:
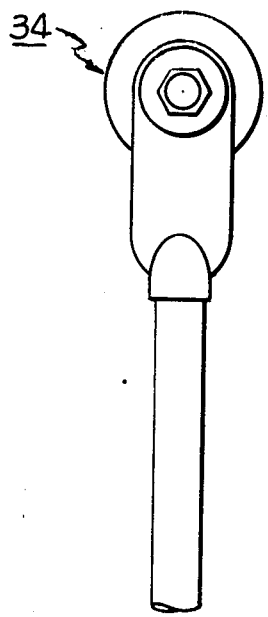
FIG. 6 is a front view of the battery cable end connector which connects with the terminal connection of this invention.
Figure 7:
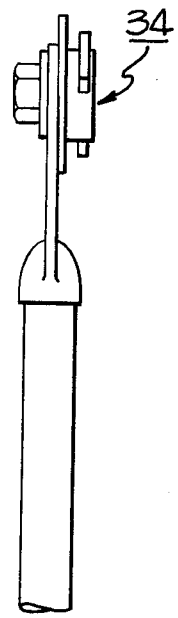
FIG. 7 is a side view of the cable end connector shown in FIG. 6.
Figure 8:
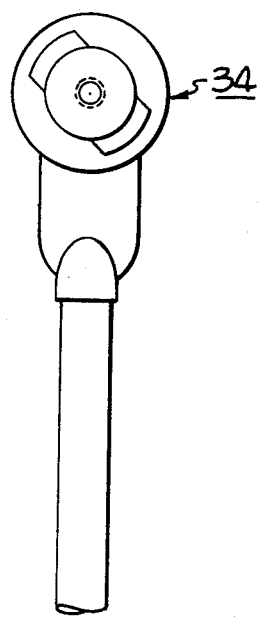
FIG. 8 is a rear view of the cable end connector shown in FIG. 6.

FIG. 1 shows in simplified form a container 10 for an automotive battery. The container 10 comprises side walls 12, end walls 14, and partition walls 16 which divide the interior of the container into cell compartments 18. Referring also to FIG. 4, in each cell compartment there are several positive and negative electrodes 20 and 22, respectively, which are alternately spaced. A separator 24 is spaced between each pair of adjacent electrodes. The positive electrodes 20 are joined together by a positive strap connector 26 while the negative electrodes 22 are similarly joined together by a negative strap connector 28. In the interior cell compartments each strap connector is electrically connected to a strap connector of opposite polarity in an adjacent cell compartment. Also shown in FIG. 1 is a cover 30 which is sealed to the battery as one of the final steps in the construction of the battery. The under side of the cover has surfaces which mate with those on the top of the container.

FIGS. 1 through 4 show the terminal connection 32 of this invention. The terminal connection 32 is a single component which is molded into and extends through the wall 14 (or, alternatively, into wall 12) of the battery container 10. The terminal connection 32 is connected to a strap connector; in one end cell the connection 32 is connected to the negative strap connector while in the other end cell the second and corresponding terminal connection (not shown) is connected to the positive strap connector.

FIGS. 5 through 8 illustrate a battery cable end connector 34, made from a good conductor such as lead, which is joined with the end 36 of a battery cable 38 by means of a securing device 40 such as a bolt. A washer 42 is shown interposed between the head of the securing device 40 and the cable end 36.

One of the features of this invention is that the terminal connection 32 has means which cooperate with the battery cable end connector 34 so that the cable end connector 34 can be connected to the terminal connection by a rotation of the cable end connector 34. As shown best in FIGS. 2 and 4, these means may comprise a pair of flanges 44 of tapered thickness which mate with a pair of corresponding flanges 46, also of tapered thickness, which form part of the cable end connector 34. The flanges 44 are connected to a recessed face 48 of the terminal connection 32 by means of tubular portion 50, and between the flanges 44 are openings 52 of relatively large diameter. To join the cable end connector 34 with the terminal connection 32, the cable end connector 34 is first rotated into a position so that its flanges 46 will match with and pass through openings 52 into the area between the flanges 44 and the face 48. The cable end connector 34 is then rotated, the flanges 44 and 46 being constructed so that they are increasingly drawn snugly together as the end connector 34 is rotated. The end face 54 may be dimensioned so that it is brought into contact with the recessed face 48 of the terminal connection 32 as the cable end connector 34 is rotated. The larger diameter face 56 of the cable end connector 34 may be dimensioned so that it comes into contact with the most outboard surface of the terminal connection if desired.

Rotation of the cable end connector 34 may be produced by rotation of the end 36 of the cable 38 if the two are fixed together so that they are always stationary with respect to each other. Such results may be obtained either by starting with two separate components 34 and 26 (as shown in the drawings) and welding or otherwise uniting them or by having the end connector 34 and the end 36 be integrally united when constructed (not illustrated in the drawings). With either alternative the cable end connector 34 may be rotated by a rotation of the end 36 of the cable 38, making possible a quick connect-disconnect arrangement in which the cable can be joined to the battery terminal without the use of tools. The terminal connection 32 and cable end connector 34 may be designed so that a rotation of 90° or less of the cable end connector is sufficient to make the required electrical connector.

Alternatively, rotation of the cable end connector can be produced by a rotation of securing device 40 without a simultaneous rotation of the end 36 of the cable 38 by fixing the securing device 40 with respect to the cable end connector 34 but not with respect to the cable end 36. With this arrangement the cable end connector 34 could be rotated into engagement with the terminal connection 32 by rotating the securing device 40 with a wrench.

It is to be understood that the alternatives described in the preceding two paragraphs are all various forms of the invention. They all are constructions in which the cable end connector 34 can be connected to the terminal connection 32 by a rotation of the cable end connector.

One of the requirements of my invention is that the terminal connection 32 be joined to a strap connector. The two are shown joined together in FIG. 4. In the construction of most batteries the strap connector would be applied to the electrodes outside the container, that combination would then be inserted into the container, and finally the strap connector and the terminal connection would be joined together inside the container; this last step might be performed, for example, by a workman using a torch and lead bar.

With an alternative construction, however, it is possible for the terminal connection to be an integrally constructed extension of the strap connector to which it is joined. In U.S. Pat. 3,519,489 (issued to F. J. Port on July 7, 1970) there is illustrated a battery consrtuction in which the strap connectors in the interior cell compartments extend through a partition wall so as to function as a positive strap connector in one cell compartment and as a negative strap connector in the adjacent cell compartment. These intercell strap connectors are inserts which are molded into the partition walls when the container is constructed. As a result, the electrodes and separators cannot be placed into the container from the top as is done with other batteries and it is therefore necessary to design the container so that the electrodes and separators can be installed through some other opening. The necessary opening is achieved by constructing the lower or bottom portion separately from the remainder or upper portion of the container so that the electrodes and separators can be inserted into the upper container portion from underneath; afterward the two portions of the container are sealed together. The junction or mating line where the two portions are sealed together is illustrated by the dashed line 75 shown in FIG. 1. Another feature shown by that patent is that one strap connector in each of the end cells may be an insert which is integrally molded through the exterior of the container when the container is constructed, the idea being that the end of this strap connector which is exposed outside the container may then serve as a terminal. My new terminal connection may be used as just described in the construction of the batteries shown in U.S. Pat. 3,519,489 and when it is, there is no need for a separate step inside the container to join the strap connector to the terminal connection. This is the construction which is meant when it is said that my terminal connection is an integrally constructed extension of the strap connector to which it is joined.

Figure 9:
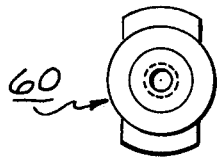
FIG. 9 is a front view of an adapter which can be used with the terminal connection of this invention.
Figure 10:
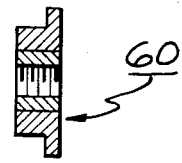
FIG. 10 is a side sectional view of the adapter shown in FIG. 9.

FIGS. 9 and 10 illustrate a modified form 60 of the needed battery cable end connector. This modified form 60, or adapter, permits batteries having my terminal connection to be used with battery cables not otherwise suitable. In general, the adapter 60 has portions (such as a pair of flanges) which mate with the terminal connection 32 in the same fashion as do the flanges 46 shown in FIG. 5 and additional portions (such as an internal threaded bore) which permit the adapter to be joined to the end of the battery cable by appropriate means.

It will be observed from the drawings and from the descriptions given above that my terminal connection results in several advantages. As with side terminals in general, the terminal has low lead content and a low resistance electrical path. No terminal posts extend up through the plane defined by the top of the container, making heat sealing of a thermoplastic container and cover much easier. When used with one of the embodiments shown in U.S. Pat. 3,519,489, no separate step is used to join the strap connector and terminal connection together inside the container. A fusion or joint between a terminal post and a bushing molded into the cover or container wall is not required. And the battery cable may easily and rapidly be connected to the terminal connection by a simple rotation of the cable end connector.

I claim:

1. A battery having a container inside of which is at least one cell compartment and having also electrodes inside the cell compartment which are connected to a strap connector, which connector is also joined to a terminal connection which extends through the wall of the battery container, wherein the improvement comprises:

the terminal connection being a single component which is molded into the wall of the battery container and is provided with a recessed face portion which has means that cooperate with a battery cable end connector so that the battery cable end connector can be connected to the terminal connection by a rotation of the cable end connector, a battery cable end connector is removably positioned in said recessed face portion of said terminal connection, the cooperating means comprising at least one flange of tapered thickness extending inwardly into said recessed face and mating with at least one corresponding flange on said battery cable end connector so that the tapered flange of the terminal connection can be increasingly drawn snugly together with the corresponding flange on the battery cable end connector when the end connector is rotated with respect to the terminal connection.

2. The battery of claim 1 in which the terminal connection is an integrally constructed extension of the strap connector to which it is joined.

3. The battery of claim 1 in which the cooperating means of the terminal connection comprises a pair of flanges of tapered thickness which mate with a pair of flanges on the battery cable end connector.

4. A battery having a container inside of which is at least one cell compartment and having also electrodes inside of the cell compartment which are connected to a strap connector, which connector is also joined to a terminal connection which extends through the wall of the battery container, wherein the improvement comprises:

the terminal connection being a single component which is molded into the wall of the battery container and which has means that cooperate with a battery cable end connector so that the battery cable end connector can be connected to the terminal connection by a rotation of the cable end connector, the cooperating means comprising at least one flange of tapered thickness connected to a recessed face of the terminal connection by means of a tubular portion of the terminal connection, the flange defining an opening of relatively large diameter at the end of the terminal connection, a battery cable end connector removably positioned in the tubular portion past the flange, the tapered flange mating with a corresponding flange of the battery cable end connector so that the tapered flange of the terminal connection can be increasingly drawn snugly together with the corresponding flange on the battery cable end connector when the end connector is rotated with respect to the terminal connection.

5. The battery of claim 4 in which the cooperating means of the terminal connection comprises a pair of flanges of tapered thickness which mate with a pair of flanges on the battery end connector.

References Cited

UNITED STATES PATENTS

| 1,316,490 | 9/1919 | Loudon | 136—166 |
|---|---|---|---|
| 2,198,320 | 4/1940 | Smithson | 339—232 |
| 1,627,442 | 5/1927 | Luthy | 339—224 |
| 1,699,925 | 1/1929 | Schmidt | 339—230 R |
| 2,704,356 | 3/1955 | Herterick | 339—188 C |
| 3,303,056 | 2/1967 | Sabatino et al. | 136—168 |
| 3,457,118 | 7/1969 | Miller | 136—135 S |
| 3,519,489 | 7/1970 | Port | 136—134 R |

FOREIGN PATENTS

| 108,849 | 2/1918 | Great Britain | 136—134 R |

DONALD L. WALTON, Primary Examiner

U.S. Cl. X.R.

136—168; 339—224, 232